(12) United States Patent
Gutberlet et al.

(10) Patent No.: US 12,305,646 B2
(45) Date of Patent: May 20, 2025

(54) COMPRESSOR SEALING ELEMENT ARRANGEMENT NEAR STATOR FOR CONTROLLING GASEOUS FLUID FLOW THERE THROUGH

(71) Applicant: Hanon Systems, Daejeon (KR)

(72) Inventors: Dirk Gutberlet, Würselen (DE); Michael Friedl, Pulheim (DE); Kadir Dursun, Hürth (DE)

(73) Assignee: HANON SYSTEMS, Daejeon (KR)

( * ) Notice: Subject to any disclaimer, the term of this patent is extended or adjusted under 35 U.S.C. 154(b) by 398 days.

(21) Appl. No.: 17/597,210

(22) PCT Filed: Oct. 7, 2020

(86) PCT No.: PCT/KR2020/013609
§ 371 (c)(1),
(2) Date: Dec. 29, 2021

(87) PCT Pub. No.: WO2021/075781
PCT Pub. Date: Apr. 22, 2021

(65) Prior Publication Data
US 2022/0307503 A1    Sep. 29, 2022

(30) Foreign Application Priority Data

Oct. 15, 2019  (DE) .................... 10 2019 127 746.9

(51) Int. Cl.
*F04C 27/00*  (2006.01)
*F04B 39/12*  (2006.01)
(52) U.S. Cl.
CPC .......... *F04C 27/003* (2013.01); *F04C 27/008* (2013.01); *F04B 39/121* (2013.01); *F04C 2240/30* (2013.01)

(58) Field of Classification Search
CPC . H02K 5/10; F04B 39/06; F04B 39/12; F04B 39/121; F04C 2240/30;
(Continued)

(56) References Cited

U.S. PATENT DOCUMENTS 11,183,902 B2 *  11/2021  Guntermann .......... H02K 11/33
11,965,508 B2 *  4/2024   Maeda ................ F04C 18/0215
(Continued)

FOREIGN PATENT DOCUMENTS

CN     206129600 U  *  4/2017
JP     2010096059 A *  4/2010
(Continued)

*Primary Examiner* — Nathan C Zollinger
(74) *Attorney, Agent, or Firm* — Shumaker, Loop & Kendrick, LLP; James D. Miller

(57) ABSTRACT

An apparatus comprising a stator and a rotor which are arranged inside a housing extending along a common longitudinal axis, wherein the stator encloses the rotor in a radial direction. A space is formed between an inside of a wall of the housing and an outside of a wall of the stator. The housing has a first housing element and a second housing element that are arranged with their contact surfaces aligned with each other thus sealing the housing. Thereby, a sealing element is arranged between the contact surfaces of the housing elements. The sealing element has the shape of an annular disc with a circumferential form and at least one sealing area. In the circumferential direction, the form corresponds to a contour of the contact surfaces. The sealing area is designed to at least partially enclose the space.

13 Claims, 9 Drawing Sheets

(58) Field of Classification Search
CPC .............. F04C 2240/805; F04C 27/005; F04C 27/003; F04C 27/008
See application file for complete search history.

(56) References Cited

U.S. PATENT DOCUMENTS

| | | |
|---|---|---|
| 2010/0223947 A1 | 9/2010 | Shibuya |
| 2010/0247348 A1 | 9/2010 | Taguchi et al. |
| 2011/0116952 A1 | 5/2011 | Yi et al. |
| 2013/0251573 A1* | 9/2013 | Duppert .............. F04C 18/0215 418/55.1 |
| 2014/0271279 A1 | 9/2014 | Kuba |
| 2019/0101119 A1* | 4/2019 | Hattori .................. F04C 29/026 |
| 2019/0383286 A1* | 12/2019 | Laville ................ F04C 18/0215 |
| 2020/0102956 A1* | 4/2020 | Seong ................ F04C 18/0269 |
| 2022/0307501 A1* | 9/2022 | Yamamoto ............ F04C 27/005 |
| 2023/0050604 A1* | 2/2023 | Leonardi ................ H02K 5/203 |
| 2024/0098925 A1* | 3/2024 | Richter .................... H05K 5/06 |

FOREIGN PATENT DOCUMENTS

| | | |
|---|---|---|
| KR | 101814923 B1 | 1/2018 |
| KR | 101860355 B1 | 5/2018 |

* cited by examiner

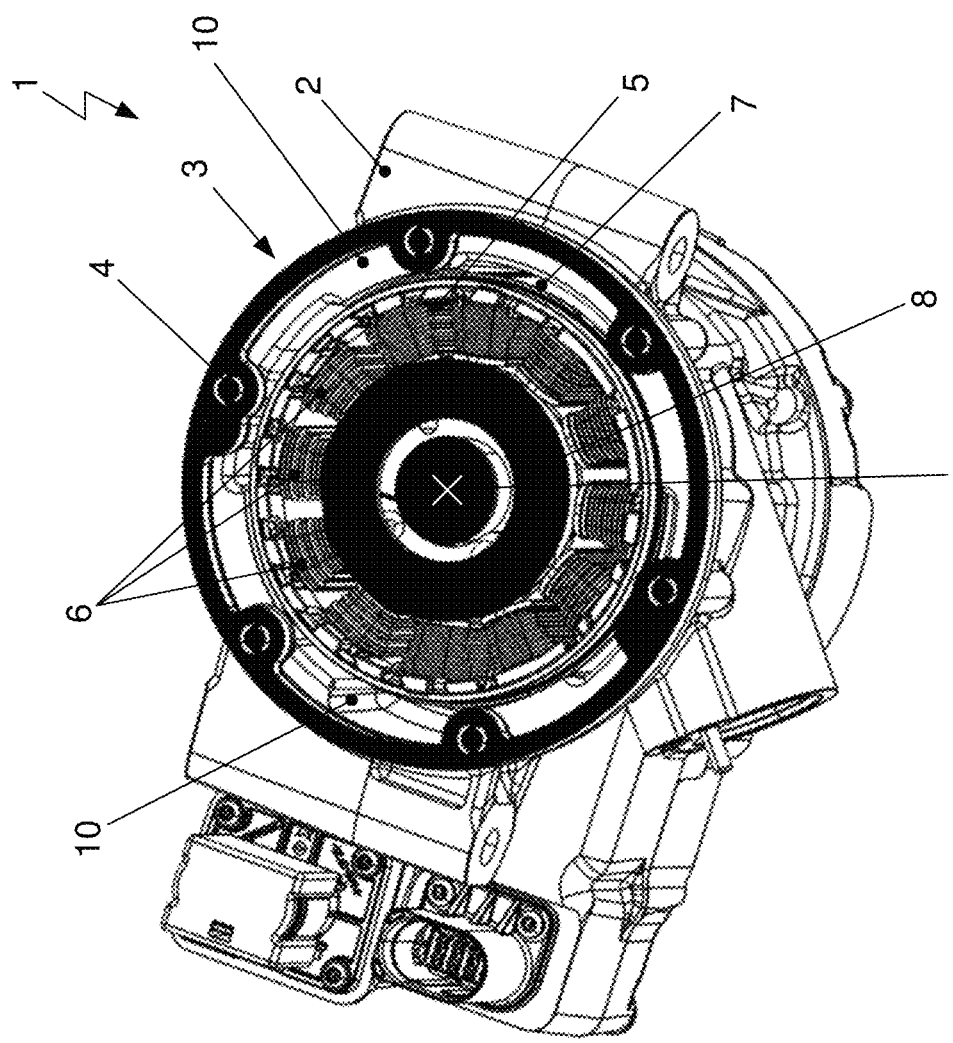

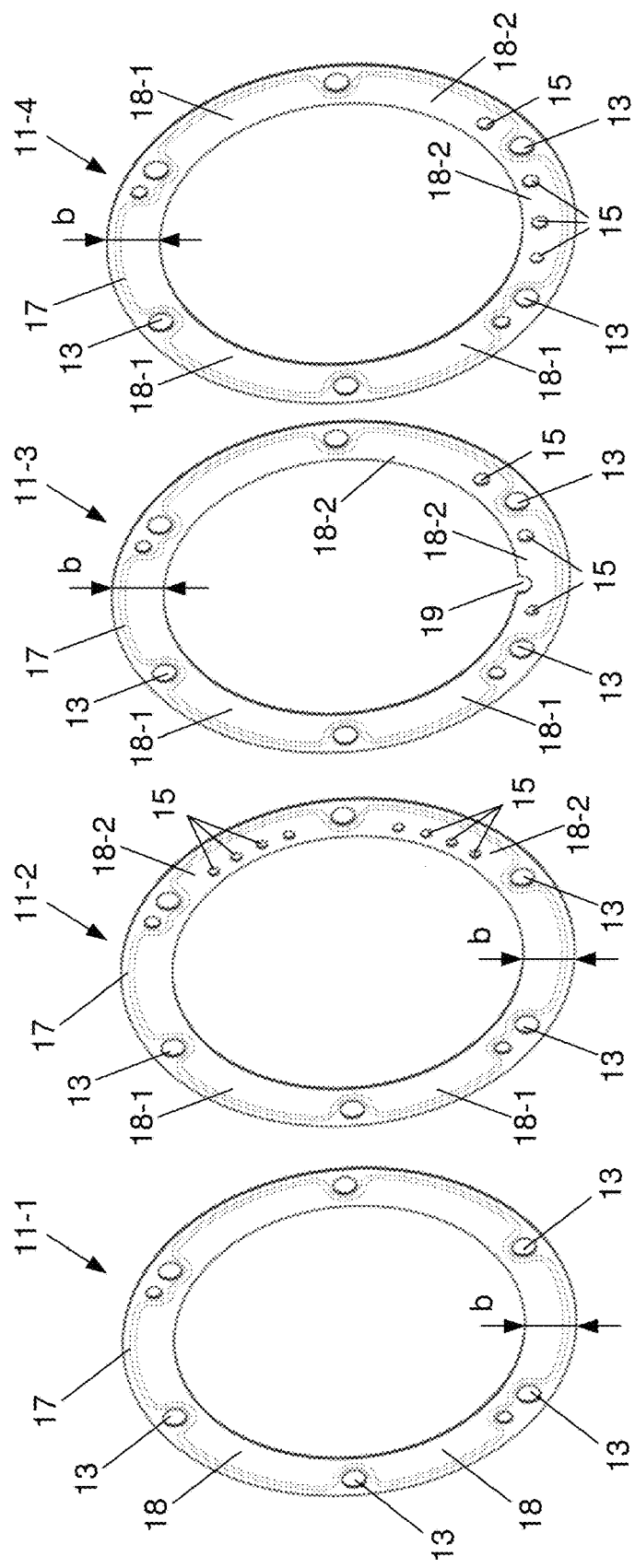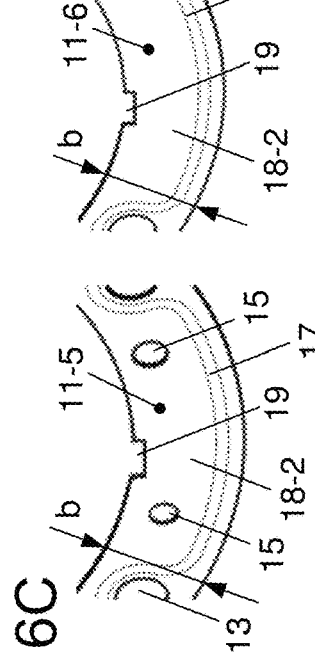

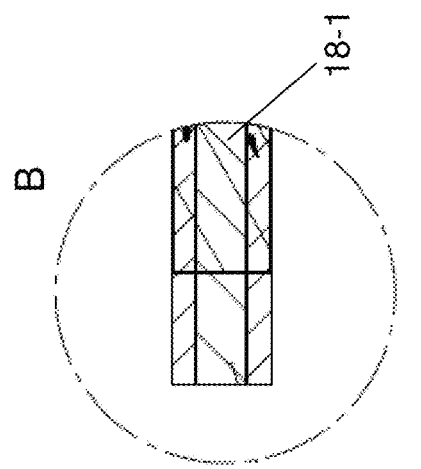
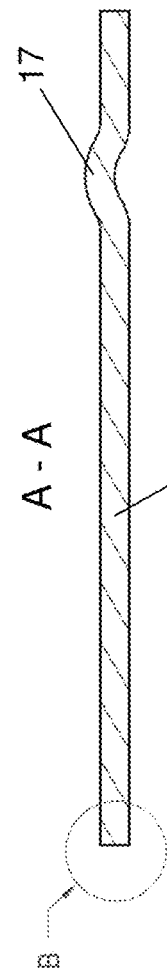
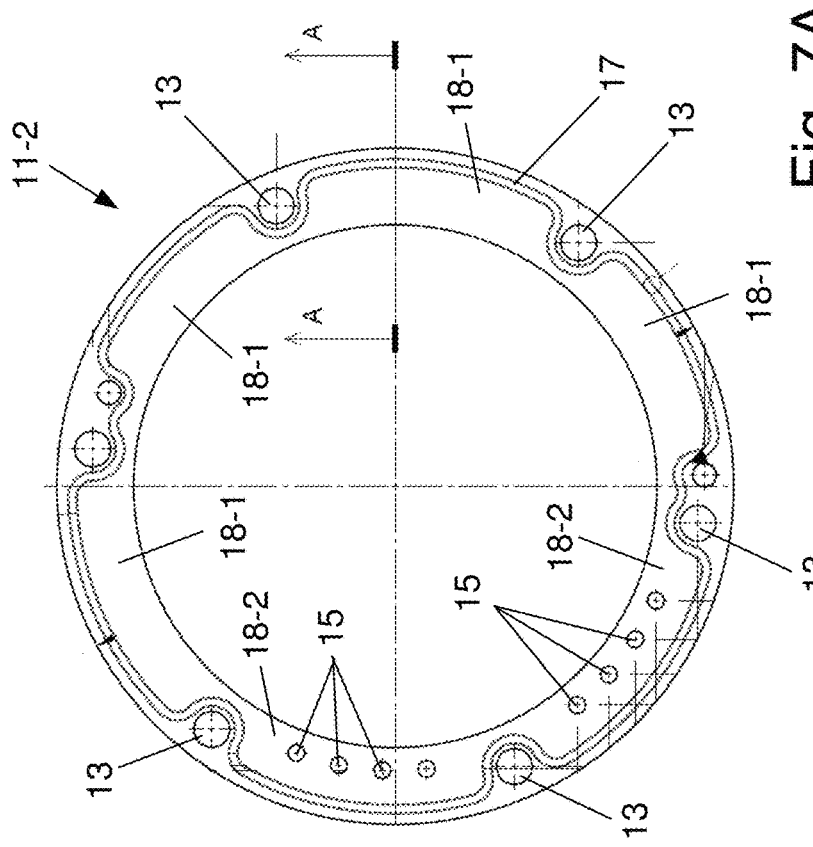
Fig. 7A
Fig. 7B
Fig. 7C

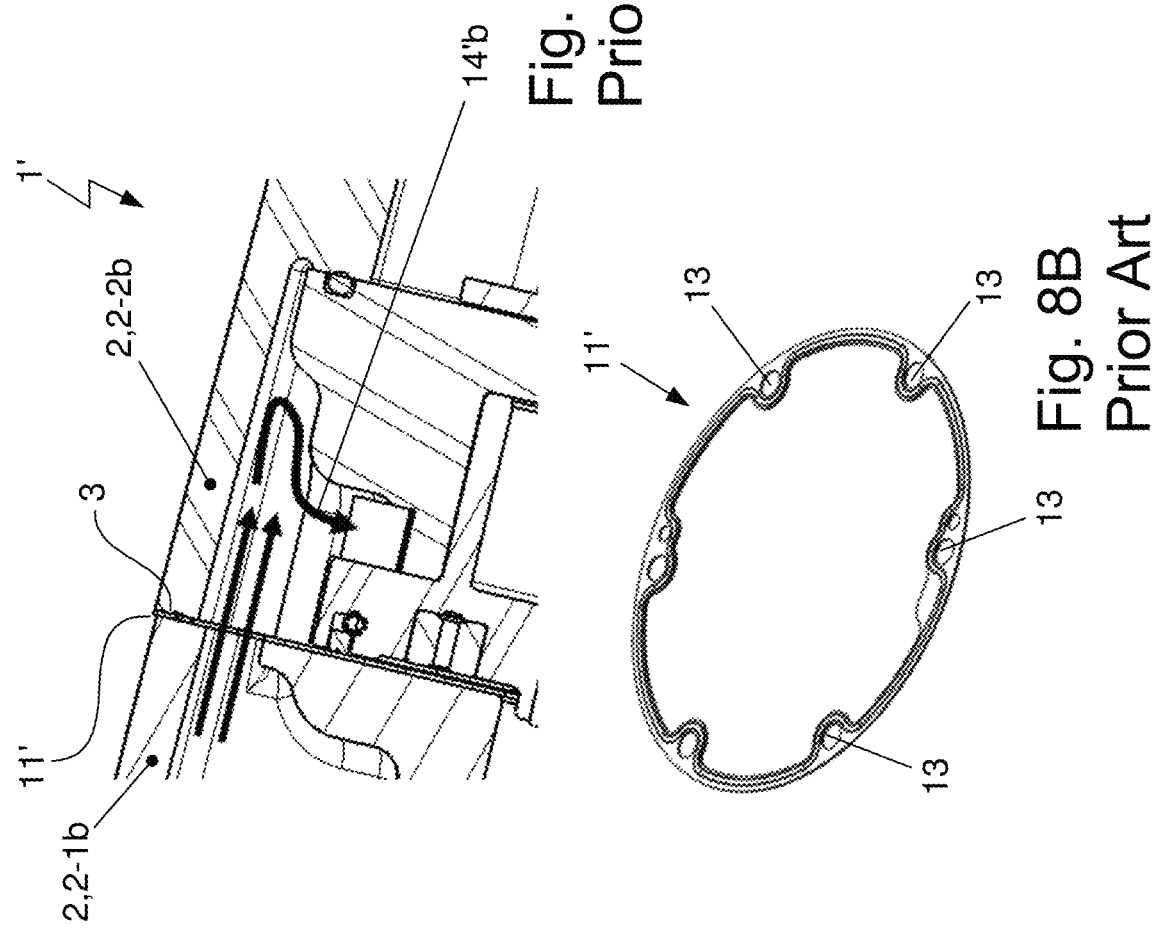

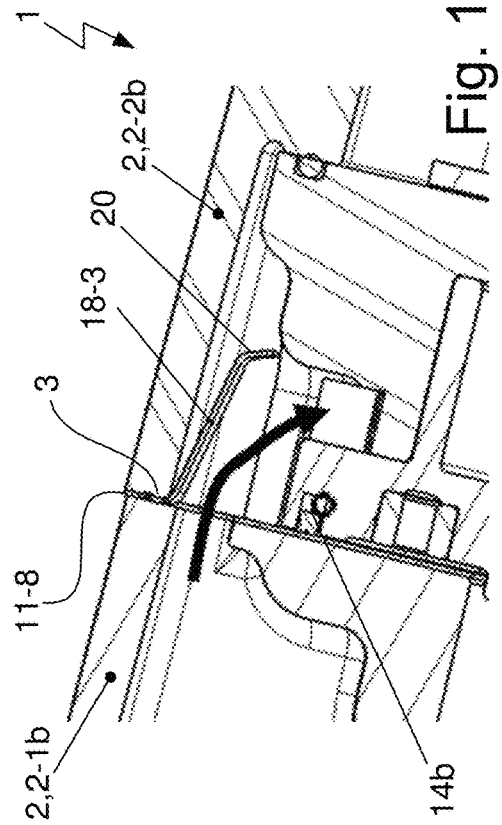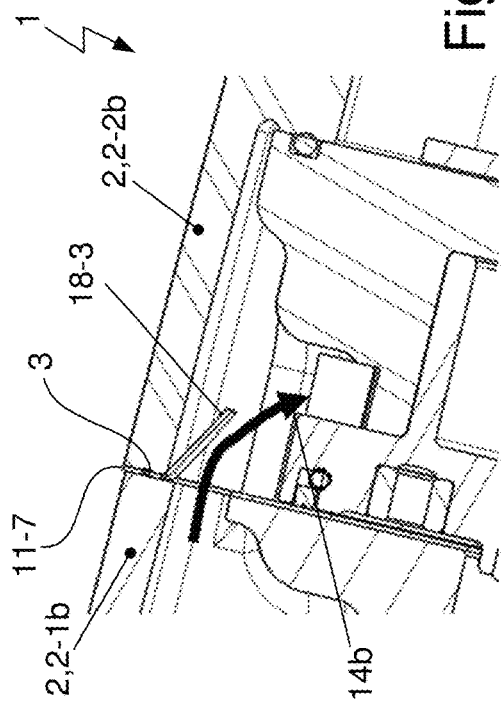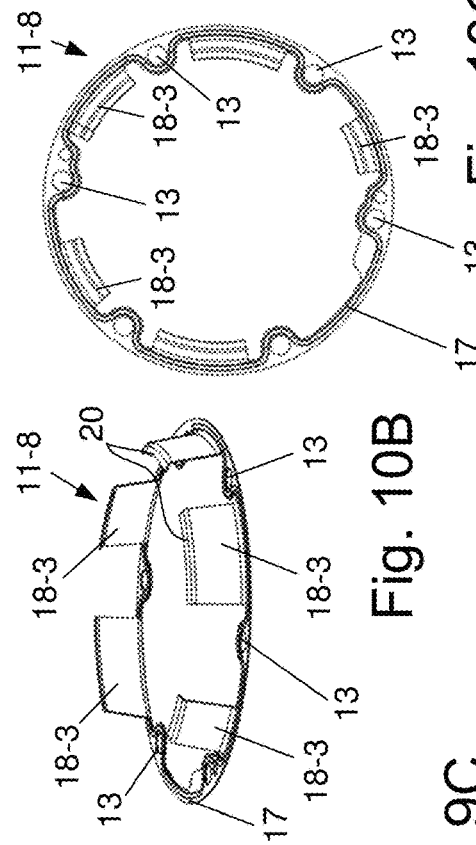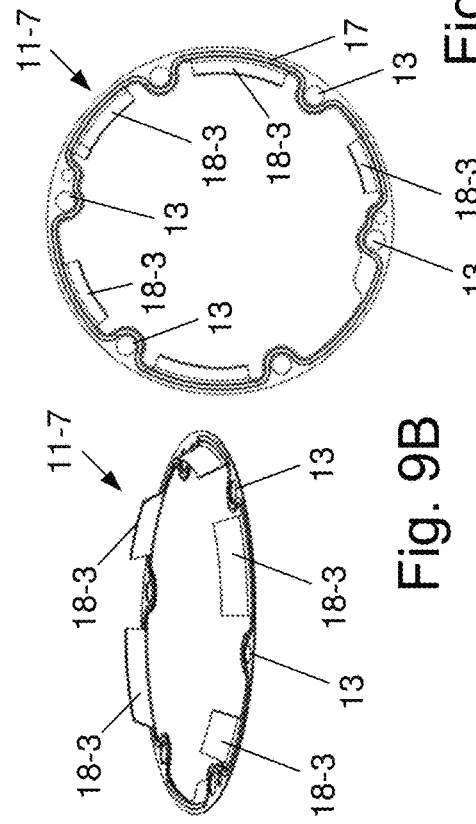

COMPRESSOR SEALING ELEMENT ARRANGEMENT NEAR STATOR FOR CONTROLLING GASEOUS FLUID FLOW THERE THROUGH

CROSS-REFERENCE TO RELATED PATENT APPLICATIONS

This patent application is a United States nation phase patent application based on PCT/KR2020/013609 filed on Oct. 7, 2020, which claims the benefit of German Patent Application No. 10 2019 127 746.9 filed on Oct. 15, 2019, the entire disclosures of which are hereby incorporated herein by reference.

TECHNICAL FIELD

The invention concerns apparatuses for compressing a gaseous fluid, especially a refrigerant. The apparatuses may be used as compressors within the refrigerant circuit of an air conditioning system in a motor vehicle. An apparatus comprises a stator and a rotor which are arranged inside a housing and extend along a common longitudinal axis. In this arrangement, the stator radially surrounds the rotor. A space is formed between an inside of a wall of the housing and an outside of a wall of the stator. The housing has housing elements that are arranged with their contact surfaces aligned with each other thus sealing the housing. A sealing element is arranged between the contact surfaces of the housing elements.

In addition, the invention concerns a method for operating such an apparatus.

BACKGROUND ART

Compressors for mobile applications, in particular for air conditioning systems in motor vehicles, for conveying refrigerant through a refrigerant circuit, also known as refrigerant compressors, as known from the state of the art are often designed as piston compressors with variable displacement volume or as scroll compressors independent of the type of refrigerant. The compressors are driven either by a pulley or electrically.

An electrically driven compressor has an electric motor to drive the respective compression mechanism. Losses occurring within the compressor lead, in particular, to the generation of heat such that the heat of the electric motor specifically must be dissipated in order to ensure safe operation of the compressor with maximum service life. For example, during compressor operation, heat, for example from a wall of a housing, is transferred directly to the refrigerant to be compressed, which affects the overall efficiency of the compressor. The overall efficiency of the compressor should be at its maximum.

In order to take into account the parameters determining the operation and, in particular, the overall efficiency of the compressor and to tailor their effects to each other, the mass flow of the refrigerant to be compressed or of a refrigerant-oil mixture must be directed and controlled along an optimum flow path by means of the compressor housing or the electric motor.

Conventional electric motors of electrically driven compressors are designed with an annular stator core with coils arranged thereon and a rotor, wherein the rotor is arranged within the stator core. The rotor and stator are aligned along a common symmetry axis or, alternatively, the rotation axis of the rotor.

Electrically driven compressors that include a housing seal designed exclusively for sealing two individual housing elements which are in contact with each other are known from the state of the art. The housing seal only fulfils the function of sealing the housing to prevent the escape of refrigerant or oil from the compressor into the environment at various pressures and temperatures. In order to simultaneously ensure the focused flow of the mass flow of the refrigerant, or the refrigerant-oil mixture, by means of the compressor housing, or via the electric motor, conventional compressors have additional components, such as insert elements for blocking as well as closing off possible flow paths and thus preventing undesired flows or directing, guiding and diverting desired flows.

SUMMARY

The purpose of the invention is to provide an apparatus for compressing a gaseous fluid, in particular an electrically driven compressor, which can be assembled in a simple and thus expeditious manner with the fewest possible number of individual components. The individual components should fulfil the large variety of known and required functions of the apparatus, especially with regard to the absorption of heat by the fluid. The apparatus is intended to be easy to implement and to minimize manufacturing costs. In particular, complexity in the construction of the apparatus should be minimized and, at the same time, sealing off the device from the environment should be assured. The overall efficiency of the device is intended to be maximized.

The problem is solved via the objects having the characteristics as shown and described herein.

The problem is solved by an apparatus according to the invention used to compress a gaseous fluid. The apparatus comprises a stationary stator and a rotor which are arranged inside a housing and extend along a common longitudinal axis. In this arrangement, the stator is positioned radially on the outside of the rotor enclosing the rotor.

A space is formed between an inside of a wall of the housing and an outside of a wall of the stator. The housing has a first housing element and a second housing element that are arranged with their contact surfaces aligned with each other thus sealing the housing. In this arrangement, a sealing element is arranged between the contact surfaces of the housing elements.

According to the invention, the sealing element has the shape of an annular disc with a circumferential molding and at least one sealing area. In the circumferential direction, the shape corresponds to a contour of the contact surfaces of the housing elements. The sealing area at least partially closes the space between the housing and the stator.

The sealing element advantageously has a shape simulating an outer contour of the contact surface of the housing elements, or the housing, in the area of the contact surfaces.

The space formed between the inside of the housing wall and the outside of the stator wall preferably has the shape of a circular ring.

The sealing element is preferably constantly aligned in a plane perpendicular to the longitudinal axis of the apparatus.

According to a first alternative embodiment of the invention, the sealing element has the shape of an annular disc with a constant width. In this embodiment, an outer diameter of the sealing element essentially corresponds to an outer diameter of the contact surface of the housing elements, whilst an inner diameter of the sealing element essentially corresponds to a diameter of the outside of the stator wall. The sealing element thus has an outer shape that almost completely closes off a flow cross-section of the space formed between the housing and the stator.

The width of the annular disc is understood to comprise an extension in the plane perpendicular to the longitudinal axis of the device in all cases.

The sealing element preferably has at least one first sealing area, which is designed as a closed surface.

Another advantage of the invention is that the sealing element has at least one second sealing area, which is formed with at least one flow opening or with at least one recess for the fluid to flow through the sealing element, or within the space enclosed by the housing, past the sealing element.

The at least one flow opening can, for example, be designed with a circular or oval flow cross-section. The shape or the size of the flow cross sections of the flow openings can be identical or vary among themselves if a plurality of flow openings are included.

A plurality is always understood to be a number of at least two.

The at least one recess can, for example, have the shape of a notch that is formed from an inner edge arranged on the inner diameter of the sealing element that extends radially outwards into the sealing area.

According to a further alternative embodiment of the invention, the sealing element has the shape of an annular disc, wherein an outer diameter of the sealing element substantially corresponds to an outer diameter of the contact surface of the housing elements, whilst an inner diameter of the sealing element is shaped to correspond to an inner diameter of the contact surface. The sealing element is preferably arranged on a common plane with the outer diameter and the inner diameter.

The sealing element has advantageously at least one sealing area that affects a flow direction of the fluid and that is arranged in a plane perpendicular to the longitudinal axis of the apparatus and is aligned to protrude within the main flow direction of the fluid through the apparatus.

The sealing area is preferably designed as an enclosed surface.

The problem is also solved by an apparatus according to the invention for compressing a gaseous fluid, comprising a housing with a first housing element and a second housing element that are each arranged with mutually aligned contact surfaces in contact with one another thus closing the housing. Accordingly, sealing element is arranged between the contact surfaces that has the shape of an annular disc with a circumferential molding and at least one sealing area. An outer diameter of the sealing element substantially corresponds to an outer diameter of the contact surface, whilst an inner diameter of the sealing element is formed with an inner diameter of the contact surface and the shape corresponds to a contour of the contact surfaces in the circumferential direction.

The sealing element according to the invention has at least one sealing area that affects a flow direction of the fluid and that is arranged in a plane perpendicular to the longitudinal axis of the apparatus and is aligned to protrude within the main flow direction of the fluid through the apparatus.

The at least one sealing area that affects the flow direction of the fluid may have the shape of a circular ring section with a constant inner diameter and constant outer diameter. The sealing area is preferably arranged in the area of an outer diameter at the inner diameter of the sealing element, projecting from the plane perpendicular to the longitudinal axis of the apparatus.

According to an advantageous embodiment of the invention, the at least one sealing area affecting the direction of flow of the fluid is arranged at an angle in the range of 20° to 70°, in particular in the range of 30° to 50°, to the direction of the longitudinal axis of the apparatus. If a plurality of sealing areas affecting the direction of flow of the fluid are used, the arrangement, in particular the angles to the direction of the longitudinal axis of the apparatus, or the dimensions of the sealing areas, may be identical or may vary among themselves.

A further advantage of the invention is that the at least one sealing area affecting the direction of flow of the fluid has at least one guide element for guiding the flow of the fluid. The guide element is arranged on an inner diameter of the sealing area.

The guide element is also preferably arranged at an angle in the range of 60° to 90°, in particular in the range of 70° to 80°, to the direction of the longitudinal axis of the apparatus.

According to an additional embodiment of the invention, the sealing element is designed to include passages to accommodate connecting elements of the housing. The at least one sealing area at least partially closing the space between the housing and the stator is arranged in the circumferential direction between adjacent passages.

The stator and rotor are preferably arranged within the first housing element.

The first housing element preferably has an inlet for aspiration of the to-be-compressed gaseous fluid into the housing, so that the fluid can be directed through the first housing element and thereby directly to the stator or rotor and then into the second housing element.

A compression mechanism is advantageously arranged within the second housing element.

According to a further preferred embodiment of the invention, the circumferential shape of the sealing element corresponding in the circumferential direction to a contour of the contact surfaces of the housing elements is formed with a crown shape on an upper side and a lower side of the sealing element.

Instead of comprising an apparatus with a plurality of individual components to fulfil a plurality of required functions, the sealing element is designed as a component of the apparatus in such a way that it actively guides the flow of the fluid, in particular a refrigerant, a refrigerant-oil mixture or an oil inside a compressor, in order to ensure the ideal balance between flow rate and heat management. The housing seal is designed to perform an integrated function within a refrigerant oil management system.

The problem is also solved by means of a method according to the invention for operating the apparatus used to compress a gaseous fluid as described above.

In this context, the fluid is introduced into a first housing element of a housing via an inlet and the fluid strikes a stator arranged in the first housing and a rotor of an apparatus for driving a compression mechanism. The fluid is directed through a space formed between adjacent coils of the stator, a space formed between the stator and the rotor, and the rotor.

The fluid is then directed into the second housing element to a compression mechanism through a sealing element located between the first housing element and a second housing element.

According to the invention, a partial mass flow of the fluid conducted through a space formed between an inner side of a wall of the housing and an outer side of a wall of the stator is directed as a bypass flow through the first housing element by means of the sealing element arranged between the housing elements.

In a further embodiment of the invention, the space is enclosed at least in part for purposes of directing the partial mass flow.

One advantage of the invention is that a flow direction of the partial mass flow may be directed to the compression mechanism in a focused manner upon introduction into the second housing element by means of the sealing element.

An advantageous embodiment of the invention permits us of the apparatus in order to compress a gaseous fluid, in particular a refrigerant compressor, in a refrigerant circuit of an air conditioning system in a motor vehicle.

The apparatus according to the invention used to compress a gaseous fluid with the sealing element designed to comprise a multi-functional component, as well as the method for operating the apparatus, provide additional advantages as summarized below:

- Integration of functions of additional components into an existing element, thereby minimizing the number of components thus making the formation of additional components unnecessary, whereby in particular the sealing element fulfils a plurality of functions, for example with regard to hermetically sealing the housing and the focused direction of the fluid through the apparatus, and thus
- simple construction and assembly, which also reduces the manufacturing costs, in particular by virtue of minimal time needed and minimum waste, as well as
- improvements in efficiency and performance of the apparatus by means of focused control of the liquid flow, for example directly to the functional parts, which results in an increase in the overall efficiency of the apparatus and avoids any need to oversize the apparatus.

BRIEF DESCRIPTION OF DRAWINGS

Further details, features and advantages of embodiments of the invention are set out in the following description of alternative embodiments with reference to the corresponding drawings. The figures show:

FIG. 1: An apparatus for compressing a gaseous fluid with an open housing viewed in the direction of a stator with coils 6 and a stator core and a rotor of an electric motor in a perspective view;

FIGS. 6A to 6F: Alternate embodiments of the sealing element according to the invention with differently designed sealing areas, flow openings and recesses in a perspective view or a perspective detailed view;

FIGS. 7A to 7C: A sealing element according to the invention according to FIG. 6B in a top view, a lateral sectional view and a detailed view of the sectional view;

FIGS. 8A and 8B: An apparatus according to FIG. 1 with a closed housing and a conventional sealing element arranged between two housing elements in a sectional view as well as a conventional sealing element in a perspective view; and FIGS. 9A to 9C and 10A to 10C: An apparatus according to FIG. 1 with a closed housing and a sealing element according to the invention arranged between two housing elements in a sectional view as well as the respective sealing elements in a perspective view.

DETAILED DESCRIPTION OF AN EMBODIMENT

Figure 2B:
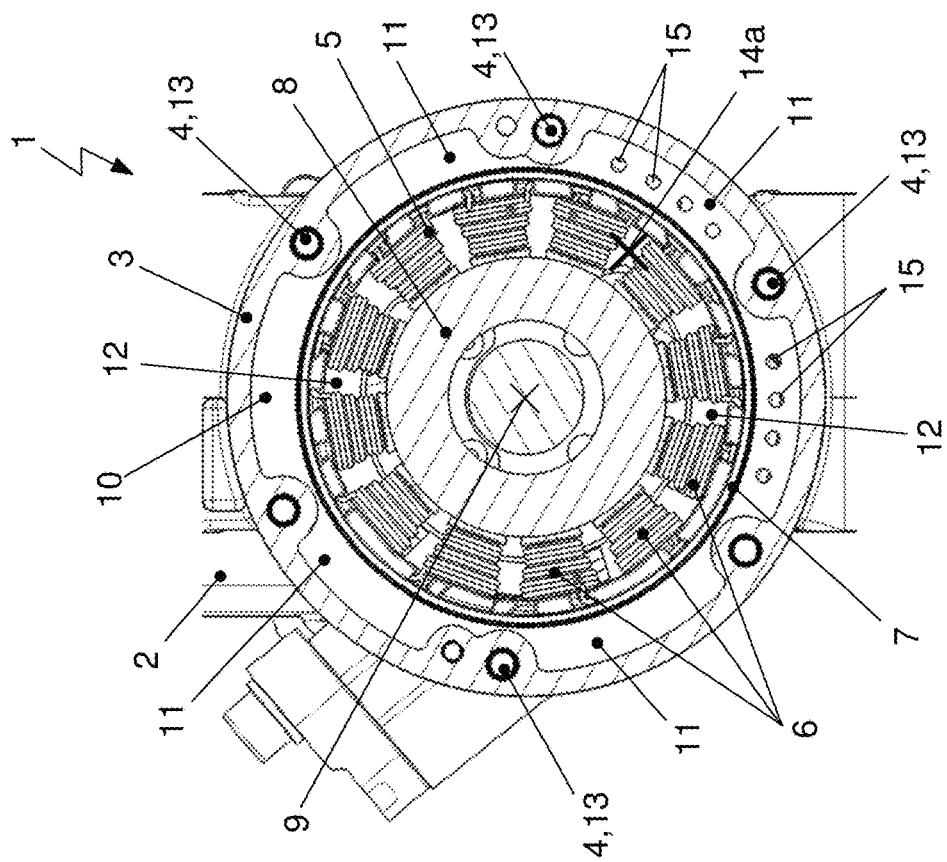
FIGS. 2A and 2B: An apparatus according to FIG. 1 with a conventional sealing element arranged on a sealing surface of the housing as well as a sealing element according to the invention, each in a top view.

FIG. 1 shows a perspective view of an apparatus 1 for compressing a gaseous fluid with an open housing 2 in the direction of view of a stator 5 with coils 6 and an at least partially insulated stator core 7 and a rotor 8 of an electric motor as an apparatus for driving the compressor, especially for a motor vehicle air conditioning system for conveying refrigerant through a refrigerant circuit.

In the case of the electric motor, for example an alternating current motor with three conducting wires—also referred to as a phase conductor or phases—the stator core 7 is arranged in the radial direction on an outer side of the rotor 8 thus circumferentially enclosing the rotor 8. The stator core 7, which is preferably designed as a laminated core with insulation at least partially surrounding the laminated core, and the rotor 8 each extend along a longitudinal axis 9, which also corresponds to the longitudinal axis of the stator 5 and the axis of rotation of the rotor 8.

The open housing 2 of apparatus 1 can be closed in the area of a contact surface 3. Accordingly, two housing elements with mutually aligned contact surfaces that hermetically seal the housing 2 are adjacent to each other. The housing elements are connected and fixed together by means of connecting elements 4. A sealing element (not shown) is also arranged between the contact surfaces 3 of the housing elements, also called sealing surfaces, of the housing elements.

A first space 10, or a gap, is formed between the inside of the wall of the housing 2 and an outside of the wall of the stator 5, in particular an outside of a wall of the stator core 7. The first space 10 essentially has the shape of a circular cylinder ring, which is circumferentially divided into individual sections in the area of the connecting elements 4 of the housing 2.

The coils 6 are each formed as an electrical conductor from a conducting wire wound around an insulated area extending inwards in the radial direction of the wall of the stator core 7. The conducting wire in the area of the coils 6 is, in each case, preferably coated and wound copper wire, whereby the non-wound ends of the conducting wires are preferably insulated with a plastic sheath as connecting leads. The areas of the stator core 7 extending radially inwards each have the shape of a cross-piece and are evenly distributed over the circumference of an outer wall of the stator core 7. There is a coil gap, also called stator gap, between adjacently aligned coils 6.

The gaseous fluid to be compressed with apparatus 1, in particular a refrigerant or a refrigerant-oil mixture, is, after being aspirated into the housing 2 of apparatus 1, conducted via components of the electric motor in order to absorb heat and then fed to a compression mechanism of the apparatus 1. On the one hand, this means that the gaseous fluid is further superheated within the compression mechanism before compression, in particular to avoid fluid hammers that could destroy the compression mechanism. On the other hand, heat generated within the electric motor is dissipated to ensure safe operation of the compressor over a maximum service life.

Figure 2A:
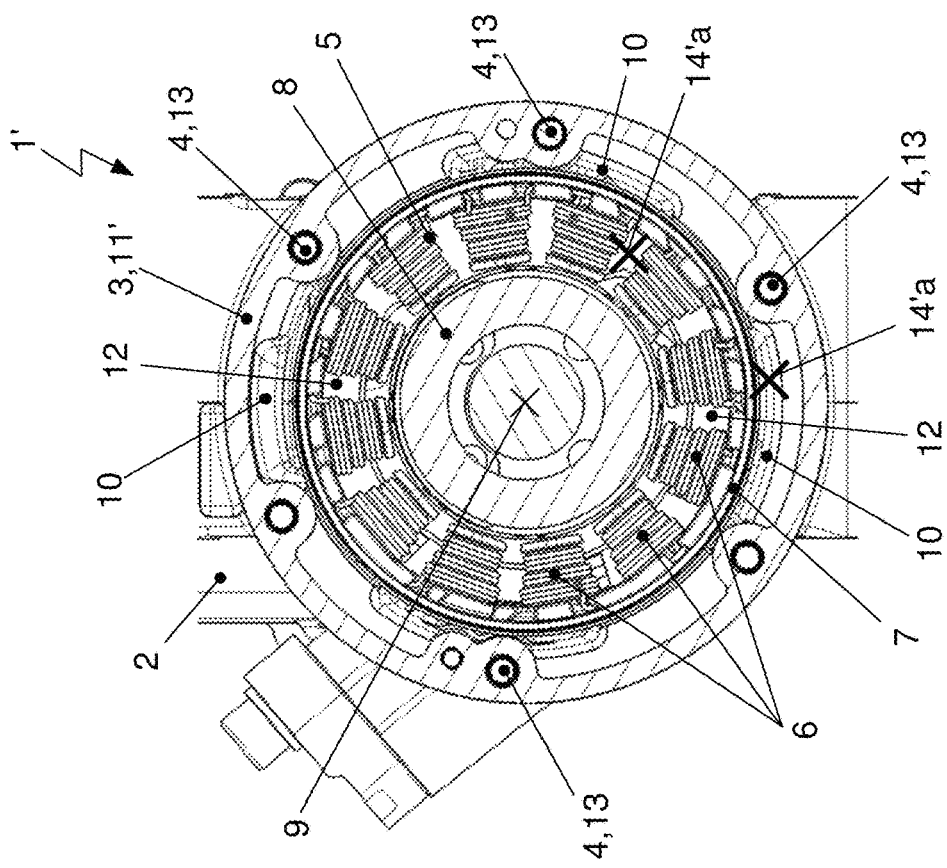

FIGS. 2A and 2B each show a top view of an apparatus 1', 1 according to FIG. 1 with a conventional sealing element 11' according to FIG. 2A arranged on a sealing surface 3 of the housing 2 as well as a sealing element according to the invention 11. The rotationally symmetric and coaxial arrangement of the stator 5 with the coils 6 and the stator core 7, as well as the rotor 8 in relation to the longitudinal axis 9, and to each other is clearly illustrated.

The sealing element 11, 11', which connects two housing elements hermetically with each other and thus closes the housing 2, rests on the contact surface 3 formed on an open front side of the housing 2. The sealing element 11, 11' is designed with passages 13 to accommodate one connecting element 4 each. As a result of the passage of the connecting elements 4 through the passages 13 of the sealing element 11, 11' or the placement of the sealing element 11, 11' on the connecting elements 4, the sealing element 11, 11' is retained on the housing 2 during the assembly of the device 1, 1', in particular during the closing of the housing 2. This prevents the sealing element 11, 11' from slipping in relation to the housing 2.

The conventional sealing element 11' is designed as a circular ring or an annular disc according to FIG. 2A and essentially has the shape of the contact surface 3 of the housing 2. In doing so, the outer diameter of the sealing element 11' corresponds to the outer diameter of the contact surface 3, whilst the inner diameter of the sealing element 11' corresponds to the inner diameter of the contact surface 3. Accordingly, in the locations of the passages 13 of the connecting elements 4 of the housing 2, the width of circular ring is larger than in the areas that are formed between the passages 13. The wall thickness of the sealing element 11' is constant.

The width of the annular disc is always in the plane perpendicular to the longitudinal axis 9 of the apparatus 1, 1', whereas the wall thickness represents a dimension of the annular disc in the direction of the longitudinal axis 9.

Due to the design of the conventional sealing element 11', which is modelled on the contact surface 3 of the housing elements, the to-be-compressed gaseous fluid is guided in the flow direction 14'a in each case through the first space 10 formed between the wall of the housing 2 and the stator 5 as a first flow path and through the second space 12 formed between adjacent coils 6, a space between stator 5 and rotor 8 and the rotor 8 as a second flow path. The mass flow of the fluid aspirated into the apparatus 1 is thus divided into partial mass flows through the spaces 10, 12, wherein one of the two partial mass flows passes the electric motor through the first spaces 10, in particular along the outside of the stator 5, and the other of the two partial mass flows passes through the electric motor.

According to FIG. 2B, the sealing element according to the invention 11 is designed as a circular ring or a annular disc with a constant width in such a way that, in addition to the contact surface 3 of the housing 2, the flow cross-section of the first space 10 formed between the inside of the wall of the housing 2 and the outside of the wall of the stator core 7 is also closed. Accordingly, an outer diameter of the sealing element 11 essentially corresponds to an outer diameter of the contact surface 3, whilst an inner diameter of the sealing element 11 essentially corresponds to an outer diameter of the wall of the stator core 7.

Due to the design of the sealing element according to the invention 11, which is modelled on the outside diameter of the outside diameter of the contact surface 3 of the housing elements and on the inside diameter of the outside diameter of the stator 5, the to-be-compressed gaseous fluid is guided in the direction of flow 14a through the second space 12 formed between adjacent coils 6, a space between stator 5 and rotor 8 and rotor 8. The flow cross-section of the first space 10 between formed the wall of the housing 2 and the stator 5 is closed by the sealing element 11. Accordingly, the mass flow of the fluid aspirated into the apparatus 1 is passed exclusively through the electric motor, in particular through the through the electric motor through the second space 12 and between the coils 6, and the rotor 8.

The sealing element 11 can be designed with flow openings 15 in order to additionally guide a second partial mass flow specifically through the first space 10 and thus to absorb heat from the inside of the wall of the housing 2 and the outside of the wall of the stator core 7. The flow openings 15 are arranged in the flow cross-section of areas of the sealing element 11 closing the first space 10. The mass flow of the to-be-compressed fluid, which is conducted through the space 10, is controlled depending on the arrangement, number and dimensions of the flow openings 15.

Figure 3B:
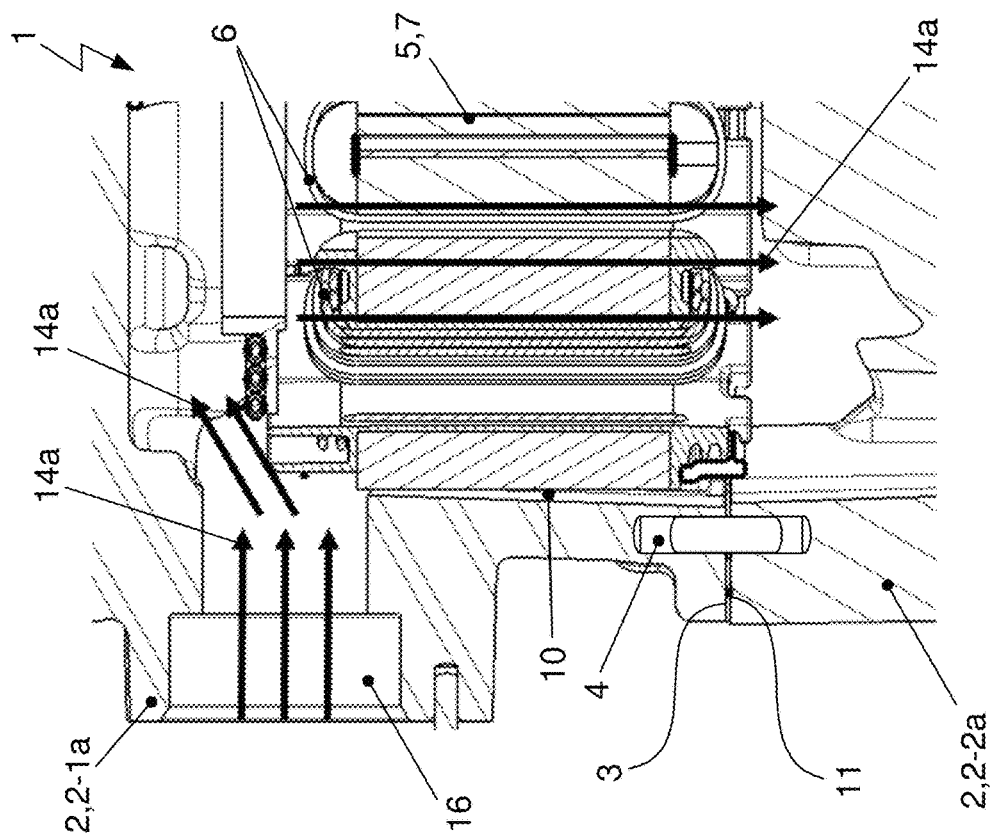
FIGS. 3A and 3B: An apparatus according to FIG. 1 with a closed housing and a conventional sealing element arranged between two housing elements as well as a sealing element according to the invention, each in a sectional view.
Figure 3A:
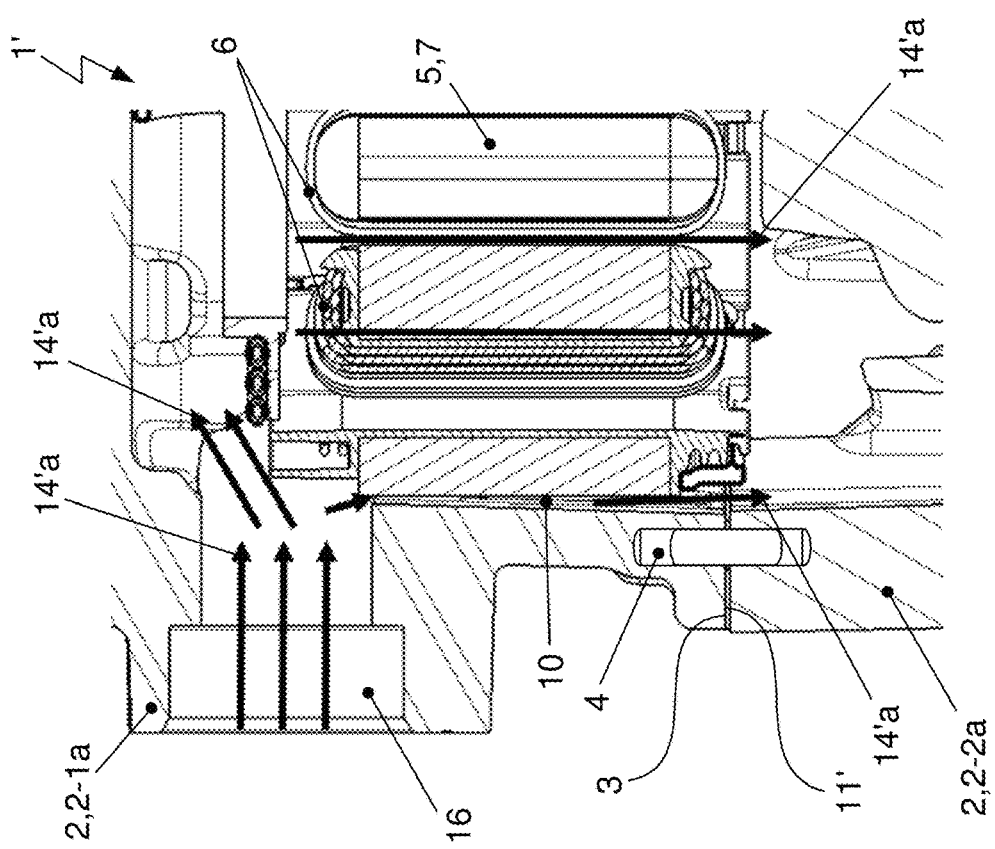
Figure 4B:
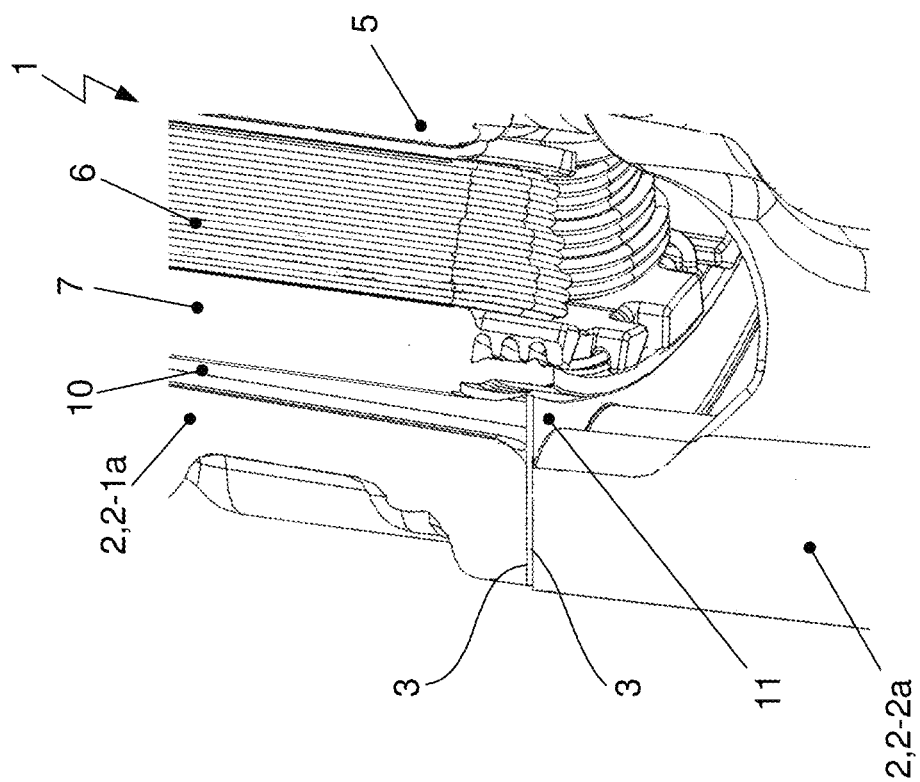
FIGS. 4A and 4B: An apparatus according to FIGS. 3A and 3B, each in a perspective detailed sectional view.
Figure 4A:
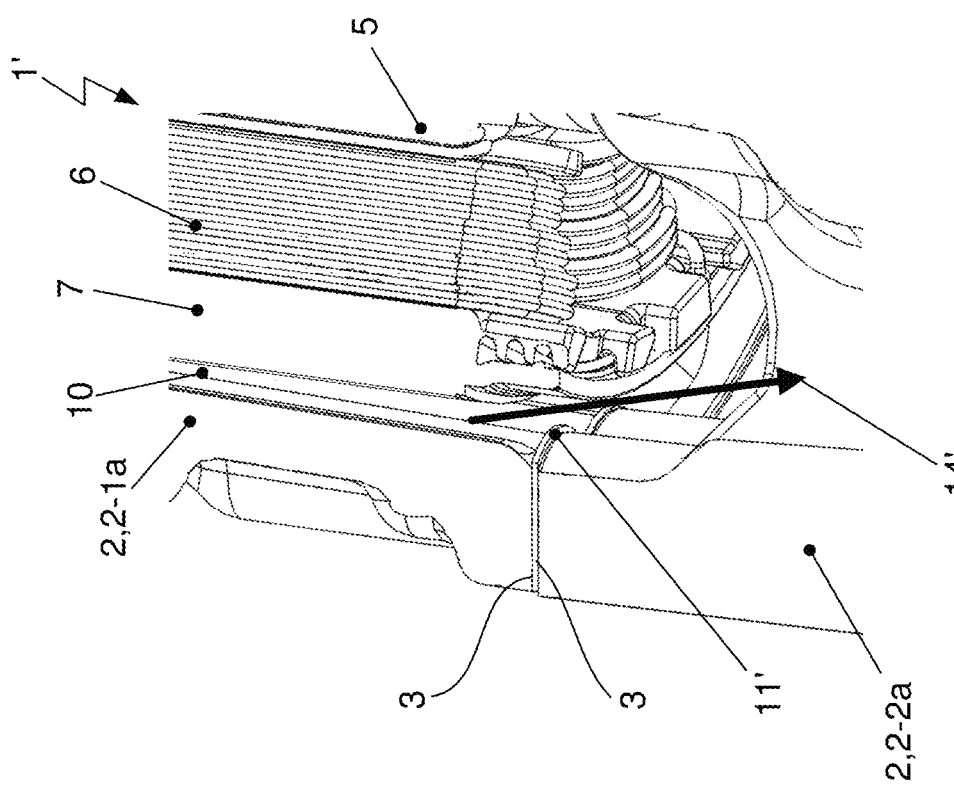

FIGS. 3A and 3B and 4A and 4B show a sectional view and a perspective detailed sectional view of an apparatus 1', 1 according to FIG. 1 or according to FIGS. 2A and 2B with a closed housing 2 and a conventional sealing element 11' arranged between two housing elements 2-1a, 2-2a, according to FIGS. 3A and 4A, as well as a sealing element 11 in accordance with the invention according to FIGS. 3B and 4B. The detailed sectional drawings in FIGS. 4A and 4B each show a section of the arrangement of sealing element 11', 11 between housing elements 2-1a, 2-2a.

A first housing element 2-1a and a second housing element 2-2a are connected to via connecting elements 4 that hermetically seal the housing 2. A conventional sealing element 11' according to FIG. 2A, or a sealing element 11 according to FIG. 2B, is arranged between the contact surfaces 3 of the housing elements 2-1a, 2-2a.

The first housing element 2-1a, which is essentially designed to accommodate the electric motor with stator 5 and the rotor 8 (not shown) has an inlet 16 for aspirating the to-be-compressed gaseous fluid into the housing. The second housing element 2-2a serves primarily to accommodate components of the compression mechanism of the apparatus 1', 1 driven by the electric motor, in particular components for storing and transmitting a rotational movement. The fluid introduced into the first housing element 2-1a in flow direction 14'a, 14a is passed through the first housing element 2-1a and the electric motor into the second housing element 2-2a.

Since the conventional sealing element 11' according to FIGS. 3A and 4A only has the outer contour of the contact surface 3 of the housing elements 2-1a, 2-2a, a first space 10 overlapping the housing elements 2-1a, 2-2a remains between the wall of housing 2 and the stator core 7 as an open first flow path for the fluid. This means that the fluid flowing into housing 2 in flow direction 14'a through inlet 16 is guided into the flow path flowing through the first space as well as through the rotor 5, in particular through the second space formed between adjacent coils 6 and the rotor 8 as a second flow path. The two partial mass flows are mixed again and introduced into the compression mechanism within the second housing element 2-2a. The mass flow of the fluid is divided into partial mass flows in an uncontrolled and unaffected when flowing through housing 2.

In comparison to the conventional sealing element 11', the sealing element according to the invention 11, which is designed as an annular disc with a constant width, has a shape which, in addition to the outer contour of the contact surface 3 of the housing elements 2-1*a*, 2-2*a*, also closes the flow cross-section of the first space 10 as the first flow path, as shown in FIGS. 3B and 4B. The sealing element 11 is thus arranged with its inner diameter in the area of the outer diameter of the wall of the stator core 7. This means that the fluid flowing into housing 2 in flow direction 14*a* through inlet 16 is guided exclusively by the electric motor, i.e. by the stator 5, in particular by the second space 12 formed between adjacent coils 6, and by the rotor 8 as a second flow path into the second housing element 2-2*a* and then fed to the compression mechanism. The first flow path is closed. No fluid is passed through the first space 10.

Figure 5:
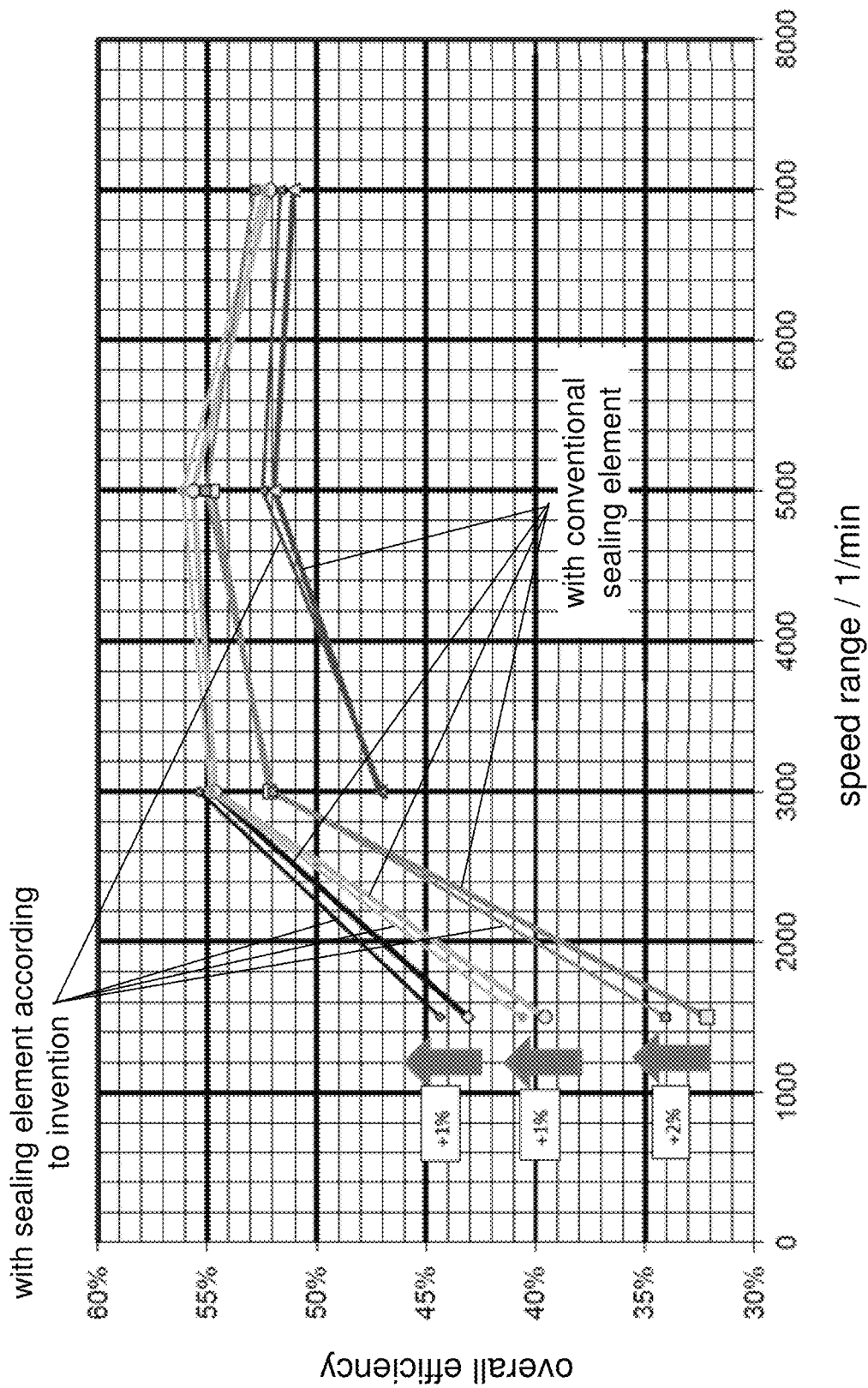
FIG. 5: A comparison of efficiencies, especially overall efficiencies, of apparatuses with conventional sealing elements and sealing elements according to the invention, depending on the speed of the apparatus.

FIG. 5 shows a comparison of efficiencies, in particular overall efficiencies, of apparatuses 1' for compressing a gaseous fluid with a conventional sealing element 11' and apparatuses 1 with a sealing element according to the invention 11, in each case depending on the speed of rotation of the apparatus 1', 1, in particular of the compression mechanism.

This clearly illustrates that the overall efficiency of apparatus 1 is increased by blocking the flow cross-section of the first space 10 of an apparatus 1 with a sealing element 11 for the to-be-compressed fluid, which is formed between the inside of the wall of housing 2 and the outside of the wall of the stator 5, and thus by blocking the bypass through which at least a partial mass flow of the fluid in a device 1' with conventional sealing element 1F is conducted past the to-be-cooled electric motor. The overall efficiency can be improved between 1% and 2%, especially when operating the apparatus 1 in the lower speed range, especially between 1,500 rpm and 2,500 rpm. The increase in the overall efficiency of the apparatus 1 with a sealing element according to the invention 11 compared to apparatus 1' with conventional sealing element 11' is observed over the entire speed range.

FIGS. 6A to 6F show alternate embodiments of the sealing element according to the invention 11 each with a form 17 with differently designed sealing areas 18, 18-1, 18-2, flow openings 15 and recesses 19 in each case in a perspective view or a perspective detailed view.

The sealing elements 11-1, 11-2, 11-3, 11-4, 11-5, 11-6 are each designed in the form of a circular ring or a circular ring disc with a circumferentially constant width b and each have passages 13 for receiving a connecting element 4 for connecting the housing elements 2-1*a*, 2-2*a* (not shown). The passages 13, specifically six of them, are evenly distributed over the circumference of the circular ring. The width b of the annular disc is designed in such a way that the outer diameter of the sealing element 11 corresponds to the outer diameter of the contact surface 3 of the housing 2 (not shown) and the inner diameter of the sealing element 11 essentially corresponds to the outer diameter of the wall of the stator 5 (not shown) in the placement area of the sealing element 11 within the apparatus 1.

In addition, the sealing elements 11-1, 11-2, 11-3, 11-4, 11-5, 11-6 each include a crown shaped form 17, which protrudes and extends completely along one upper side. An opposing side of the form 17, in particular an indentation extending into the underside, is arranged on an underside of the sealing element 11-1, 11-2, 11-3, 11-4, 11-5, 11-6. The form 17 is circumferentially closed and runs essentially on the outside diameter of the circular ring disc, reproducing the outer contour of the sealing surface 3 of the housing elements 2-1*a*, 2-2*a* (not shown). The forms 17 are arranged to at least partially surround the passages 13 in the direction of the sealing surface only in the area of the passages 13.

The sealing element 11-1 from FIG. 6A represents a basic version of the sealing element according to the invention 11 with closed sealing areas 18. The sealing areas 18 are designed in such a way that the flow cross-section of the first space 10 between formed the wall of the housing 2 and the stator 5 is at least almost completely closed by the sealing element 11. The sealing element 11-1 thus seals not only the adjacent housing elements 2-1*a*, 2-2*a* but also the flow cross-section of the space 10, so that the fluid does not flow through the space 10 as a possible flow path.

In comparison to the conventional sealing element 11' on the inner diameter, sealing element 11-1, which is extended in radial direction up to stator 5, serves to avoid undesired bypass flows along the outside of stator 5 and forces the fluid to flow along the inside of stator 5 and thus between stator 5 and rotor 8. However, flow openings 15 or recesses 19, respectively, are provided within the fully enclosed sealing area 18 on certain positions in order to permit the focused and controlled division of the fluid into partial mass flows as well as an axially aligned flow on the part of at least one partial mass flow of the fluid between the wall of the housing 2 and the exterior of the stator 5 as a bypass flow.

The sealing elements 11-2, 11-3, 11-4, 11-5, 11-6 according to FIGS. 6B to 6F have, in addition to the first, closed sealing areas 18-1, similar to the sealing areas 18 of sealing element 11-1 from FIG. 6A, second sealing areas 18-2 with additional flow openings 15 or recesses 19 in order to guide at least a partial mass flow of the fluid to be compressed specifically through the first space 10 and thus to absorb heat from the inside of the wall of housing 2 and the outside of the wall of the stator core 7. The flow openings 15 and recesses 19 of the sealing elements 11-2, 11-3, 11-4, 11-5, 11-6 are each arranged within a sealing area 18 of the sealing element 11-1 from FIG. 6A, which otherwise closes the flow cross-section of the first space 10. The partial mass flow of the fluid to be compressed, which is conducted through the intermediate space 10, is controlled depending on the arrangement, number and dimensions of the flow openings 15 or the shape of the recess 19 which comprise parameters to be varied. The recesses 19 are designed as notches that extend radially outwards from an inner edge or from the inner radius of the circular ring disc.

For example, the sealing element 11-2 from FIG. 6B is thus designed with four flow openings 15 each in two adjacent second sealing areas 18-2. Adjacent flow openings 15 of the four flow openings 15 are evenly spaced. The flow openings 15 are each arrange on an equal radius of the circular ring disc.

The sealing element 11-3 from FIG. 6C has a second sealing area 18-2 with a single flow opening 15. An adjacent second sealing area 18-2 is provided with two flow openings 15 and a recess 19. The recess 19 is arranged in the circumferential direction between the flow openings 15 and is designed in the form of a semi-circular surface, i.e. with a semicircular flow cross-section.

The sealing element 11-4 from FIG. 6D has a second sealing area 18-2 with a single flow opening 15, similar to the sealing element 11-3 shown in FIG. 6C. In contrast to sealing element 11-3, the adjacent second sealing area 18-2 has three flow openings 15, which are evenly spaced and arranged on an equal radius of the circular ring disc.

The sealing element 11-5 shown in a perspective detail view according to FIG. 6E has a second sealing area 18-2, similar to the sealing element 11-3 from FIG. 6C, with two flow openings 15 as well as a recess 19. The recess 19 is arranged in the circumferential direction between the flow openings 15 with a right-angled form, i.e., this means that it has a right-angled flow cross-section.

The sealing element 11-6 according to FIG. 6F, also shown in perspective detail view, has a second sealing area 18-2, similar to the sealing element 11-5 from FIG. 6E, but exclusively with right-angled shaped recess 19.

FIGS. 7A to 7C show the sealing element 11-2 according to FIG. 6B in a top view, a lateral sectional view and a detailed view of the sectional view with the passages 13, the crown shape 17 and the different sealing areas 18-1, 18-2, wherein the flow openings 15 are formed in the second sealing areas 18-2.

The sectional view shown in FIG. 7B, clearly shows the crown-shaped, fully circumferential form 17, which protrudes from the upper side of the circular ring disc and into the underside of the circular ring disc.

FIG. 7C shows that the sealing element 11-2 is designed as a coated and thus multi component system as example for all of the sealing elements 11 shown in the figure. The base material used is a steel that is, in particular, coated over its entire surface, for example with nitrile rubber, abbreviated as NBR for Nitrile Butadiene Rubber.

FIG. 8A shows an apparatus 1' according to FIG. 1 with a closed housing 2 and a conventional sealing element 11' arranged between two housing elements 2-1*b*, 2-2*b* in a sectional view, whilst FIG. 8B shows a conventional sealing element 11' in a perspective view.

As shown, the fluid to be compressed flows in the flow direction 14'*b* from the first housing element 2-1*b*, which is designed to accommodate the electric motor including stator 5 and rotor 8 which are not shown, or to accommodate components of the compression mechanism driven by the electric motor, in particular components for supporting and transmitting a rotational movement, into the second housing element 2-2*b* which encloses the compression mechanism.

A more detailed explanation of the design of the conventional sealing element 11' with passages 13 for the connecting elements 4 may be found in the preceding description, in particular FIG. 2A.

Since, due to the design of the conventional sealing element 11', the fluid flows undirected in flow direction 14'*b* into the space enclosed by the second housing element 2-2*b* in conjunction with the compression mechanism, when it enters certain free spaces, for example those designed as recesses open only on one side, backflows occur within such free spaces that are oriented opposite to the desired flow direction. The backflows lead to flow losses and thus to additional energy losses, which reduce the overall efficiency of the apparatus 1'.

FIGS. 9A and 10A each show an apparatus 1 according to FIG. 1 with a closed housing 2 and a sealing element 11-7, 11-8 according to the invention arranged between two housing elements 2-1*b*, 2-2*b* in a sectional view, whilst FIGS. 9B and 10B show the respective sealing element 11-7, 11-8 in a perspective view and FIGS. 9C and 10C show a top view.

In comparison to the conventional sealing element 11' shown in FIGS. 8A and 8B, the sealing elements 11-7, 11-8 are designed as alternative embodiments of the sealing element according to the invention 11 include, in addition to the passages 13 for the connecting elements 4 and the form 17, additional sealing areas 18-3 affecting the flow of the fluid essentially in the flow direction 14*b*.

The sealing elements 11-7, 11-8 are each designed as a circular ring or an annular disc, which essentially reproduces the shape of the contact surface 3 of the housing 2. In doing so, the outer diameter of the sealing element 11-7, 11-8 corresponds to the outer diameter of the contact surface 3 and is constant, whilst the inner diameter of the sealing element 11-7, 11-8, which is located in the plane of the outer diameter, corresponds to the inner diameter of the contact surface 3. The diameters are aligned in a common plane perpendicular to the longitudinal axis 9 of the apparatus 1. In the locations of the passages 13 of the connecting elements 4 of the housing 2, the inner diameter of the circular ring is smaller than in the areas that are formed in the circumferential direction between the passages 13.

The sealing element 11-7, 11-8 has additional sealing areas 18-3 in order to guide the mass flow of the fluid to be compressed into the second housing element 2-2*b* in a focused manner, especially to the compression mechanism.

The additional sealing areas 18-3 can be designed as components of the sealing element 11-7, 11-8 which at least partially close the flow cross-section of the first space 10 and thus the partial mass flow, in particular the partial mass flow conducted through the first space 10 for absorbing heat from the inside of the wall of the housing 2 and the outside of the wall of the stator core 7, and are aligned to extend out in the direction of the longitudinal axis 9 of the apparatus 1 or in the flow direction 14*b* of the fluid from the plane in which the outer diameter of the sealing element 11-7, 11-8 is arranged.

The sealing areas 18-3 each have the shape of a circular ring section with a constant inner diameter and constant outer diameter. The sealing areas 18-3 are connected to the sealing element 11-7, 11-8 in the area of the outer diameter, preferably continuously, at the inner diameter of the area simulating the contact surface 3 of the housing 2 between the passages 13 of the connecting elements 4 with the sealing element 11-7, 11-8. The sealing areas 18-3 are aligned as sections of the sealing element 11-7, 11-8 at a specific angle in relation to the direction of the longitudinal axis 9 of the apparatus 1. The angle preferably has values in the range from 20° to 70°, especially in the range from 30° to 50°.

The sealing areas 18-3 of a sealing element 18-3 can vary in position, especially the value of the angle, number and dimensions among each other as required.

In the case of the embodiment of the sealing element 11-8 according to FIGS. 10A to 10C, the sealing areas 18-3 have additional guide elements 20, which are arranged on an inner diameter of the sealing area 18-3. Whilst the sealing areas 18-3 in the area of the outer diameter are aligned at a certain angle to the direction of the longitudinal axis 9 of the apparatus 1 out of the plane perpendicular to the longitudinal axis 9, the additional guide elements 20 are angled back in the direction of the plane perpendicular to the longitudinal axis 9. The angle between the direction of the longitudinal axis 9 of apparatus 1 and the guide element 20 preferably has values in the range of 60° to 90°, in particular in the range of 70° to 80°.

The sealing areas 18-3 of the sealing elements 11-7, 11-8 serve as flow guide components, or with the additional guide elements 20, especially for actively influencing the flow direction 14*b* of the fluid when entering the second housing element 2-2*b* or the compression mechanism of the apparatus 1. The flow direction 14*b* is controlled by means of the number, dimension and shape of the sealing areas 18-3 as parameters to be varied depending on the arrangement, especially at an angle to the longitudinal axis 9 of the apparatus 1.

The sealing elements 11, 11-1, 11-2, 11-3, 11-4, 11-5, 11-6, 11-7, 11-8 according to the invention are designed for actively influencing the flow of a fluid, in particular a refrigerant or a refrigerant-oil mixture within a compressor of a refrigerant circuit of a motor vehicle air conditioning system, without the use of separate components, in order to ensure an optimum balance between a free and a guided flow and thus providing flow management and heat management.

The flow openings 15 or the recesses 19 also serve to control the oil flow within housing 2, whereby the oil can flow from the second housing element 2-2a back into the first housing element 2-1a, which is designed as an engine housing, for example, to lubricate engine bearings.

The invention concerns apparatuses for compressing a gaseous fluid, especially a refrigerant. The apparatuses may be used as compressors within the refrigerant circuit of an air conditioning system in a motor vehicle. An apparatus comprises a stator and a rotor which are arranged inside a housing and extend along a common longitudinal axis. In this arrangement, the stator radially surrounds the rotor. A space is formed between an inside of a wall of the housing and an outside of a wall of the stator. The housing has housing elements that are arranged with their contact surfaces aligned with each other thus sealing the housing. A sealing element is arranged between the contact surfaces of the housing elements.

In addition, the invention concerns a method for operating such an apparatus.

The invention claimed is:

1. An apparatus for compressing a gaseous fluid, comprising:
a stator and a rotor which are arranged in such a way as to extend along a common longitudinal axis within a housing such that the stator encloses the rotor in a radial direction, and in that a space is formed between an inner side of a wall of the housing and an outer side of a wall of the stator, wherein the housing is formed from a first housing element and a second housing element, which are each arranged with mutually aligned contact surfaces closing the housing and resting against one another, wherein a sealing element is arranged between the contact surfaces, wherein the sealing element has a shape of an annular disc with a constant width, wherein the sealing element further includes a circumferentially extending form and at least one first sealing area, wherein the form corresponds in a circumferential direction to a contour of the contact surfaces and the at least one first sealing area partially closes the space between the inner side of the wall of the housing and the outer side of the wall of the stator, and wherein an outer diameter of the sealing element substantially corresponds to an outer diameter of the contact surfaces and an inner diameter of the sealing element substantially corresponds to a diameter of the outer side of the wall of the stator such that the sealing element abuts against the outer side of the wall of the stator.

2. The apparatus according to claim 1, wherein the sealing element has at least one second sealing area which is a closed surface.

3. The apparatus according to claim 1, wherein the at least one first sealing area is formed with at least one flow opening and/or at least one recess for the fluid to pass through.

4. The apparatus according to claim 3, wherein the at least one flow opening is formed with a circular or oval flow cross-section.

5. The apparatus according to claim 3, wherein the at least one recess has a shape of a notch which is formed extending radially outwards from an inner edge arranged on the inner diameter of the sealing element.

6. The apparatus according to claim 1, wherein the at least one first sealing area affects a flow direction of the gaseous fluid and is arranged in a plane perpendicular to the longitudinal axis of the apparatus and is aligned to protrude within a main flow direction of the gaseous fluid through the apparatus.

7. The apparatus according to claim 1, wherein the stator and the rotor are arranged within the first housing element.

8. The apparatus according to claim 1, wherein the first housing element has an inlet for aspiration of the gaseous fluid into the housing.

9. The apparatus according to claim 1, wherein a compression mechanism is arranged within the second housing element.

10. The apparatus according to claim 1, wherein the space formed between the inner side of the wall of the housing and the outer side of the wall of the stator has a shape of a circular cylindrical ring.

11. The apparatus according to claim 1, wherein the form is formed to be crowned-shaped on an upper side and a lower side of the sealing element.

12. A method for operating the apparatus for compressing the gaseous fluid according to claim 1, wherein the gaseous fluid is introduced through an inlet into the first housing element of the housing, and the stator arranged in the first housing element and the rotor for driving a compression mechanism are acted upon by the gaseous fluid, wherein the gaseous fluid is passed through a space formed between adjacently disposed coils of the stator, a space formed between the stator and the rotor, as well as the rotor, wherein the gaseous fluid is then directed into the second housing element to the compression mechanism through the sealing element disposed between the first housing element and the second housing element, wherein a partial mass flow of the gaseous fluid conducted through the space formed between the inner side of the wall of the housing and the outer side of the wall of the stator as a bypass flow through the first housing element is controlled by means of the sealing element arranged between the first housing element and the second housing element.

13. The method according to claim 12, wherein a flow direction of the partial mass flow is directed in a focused manner to a compression mechanism by means of the sealing element upon entering the second housing element.

* * * * *